United States Patent [19]
Burst et al.

[11] Patent Number: 4,889,382
[45] Date of Patent: Dec. 26, 1989

[54] VEHICLE SPOILER ARRANGEMENT

[75] Inventors: Hermann Burst, Rutesheim; Jürgen Durm, Ditzingen; Helmut Kretschmer, Bessenbach; Georg Schuhmann, Leonberg, all of Fed. Rep. of Germany

[73] Assignee: Porsche AG, Weissach, Fed. Rep. of Germany

[21] Appl. No.: 303,989

[22] Filed: Jan. 30, 1989

Related U.S. Application Data

[63] Continuation of Ser. No. 48,727, May 11, 1987, abandoned.

[30] Foreign Application Priority Data

May 9, 1986 [DE] Fed. Rep. of Germany ....... 3615584

[51] Int. Cl.$^4$ ............................................. B62D 35/00
[52] U.S. Cl. ................................. 296/180.5; 180/68.1
[58] Field of Search .......................... 296/180.1–180.3, 296/180.5, 91, 216, 217; 180/68.1; 160/96; 98/99.4

[56] References Cited

U.S. PATENT DOCUMENTS

| 318,494 | 5/1985 | Olsen | 98/99.4 |
|---|---|---|---|
| 1,603,181 | 10/1926 | Aborn | 296/216 X |
| 3,006,268 | 10/1961 | Du Bois, III | 98/99.4 |
| 3,791,468 | 2/1974 | Bryan, Jr. | 296/12 X |
| 3,922,032 | 11/1975 | Schaller | 296/217 |
| 4,018,476 | 4/1977 | Lutz et al. | 296/217 |
| 4,509,786 | 4/1985 | Gregg | 296/12 |

FOREIGN PATENT DOCUMENTS

| 732596 | 3/1943 | Fed. Rep. of Germany . | |
|---|---|---|---|
| 2851639 | 6/1980 | Fed. Rep. of Germany . | |
| 3003565 | 8/1981 | Fed. Rep. of Germany . | |
| 3012538 | 10/1981 | Fed. Rep. of Germany | 296/217 |
| 3019150 | 11/1981 | Fed. Rep. of Germany . | |
| 3103062 | 8/1982 | Fed. Rep. of Germany | 296/216 |
| 211917 | 12/1983 | Japan | 296/217 |
| 1384992 | 2/1975 | United Kingdom . | |

OTHER PUBLICATIONS

MOT Journal, pp. 78 & 79, No. 17/1984, "Letters from Readers".

Primary Examiner—Dennis H. Pedder
Attorney, Agent, or Firm—Barnes & Thornburg

[57] ABSTRACT

A rear engine hood and a spoiler arrangement for the rear area of a vehicle body is disclosed. The spoiler arrangement is movable from an inoperative position flush with the body contours into an operative position to serve as a spoiler. A fan is assigned to the rear engine for taking in cooling air via air inlet openings of the spoiler arrangement, which cooling air acts upon a radiator mounted below the spoiler arrangement. In its operative position, the spoiler arrangement extends at a distance to the body, whereby, between the spoiler arrangement and the body, a rear transversely extending gap area and lateral gap areas are formed. These gap areas are covered by cover elements, achieving not only a targeted admission of cooling air to the radiator but also ensuring that undesirable exhaust gases or dirt particles are kept away from the fan.

6 Claims, 5 Drawing Sheets

VEHICLE SPOILER ARRANGEMENT

This is a continuation of application Ser. No. 048,727, filed on May 11, 1987, now abandoned.

BACKGROUND AND SUMMARY OF THE INVENTION

The invention relates to a motor vehicle, particularly a passenger car, having a radiator and a spoiler arrangement arranged in the rear area, cooling air being taken in by means of a fan of the rear engine and through air inlet openings of the spoiler arrangement, flowing to a radiator located below.

In the journal MOT, No. 17/1984, Page 79, a vehicle having a rear motor is shown that on the upper side of the rear has a a stationarily developed spoiler. This spoiler is provided with air inlet openings through which, by means of a fan of the engine, cooling air is sucked into a radiator arranged below the spoiler arrangement.

Based on German Published Unexamined Patent Application (DE-OS) 28 51 639, a passenger car is known that has a spoiler arrangement located in the rear area, in which case the spoiler arrangement, by means of an adjusting device, can be moved from an inoperative position extending flush with the adjacent body into a moved-out operative position.

When a vehicle having a rear engine and a radiator that is arranged on the rear side is equipped with an adjustable spoiler arrangement according to DE-OS 28 51 639, the radiator, when the spoiler arrangement is moved out, would be acted upon only insufficiently by cooling air, because no defined guiding of air is provided. In addition, because of the vacuum existing in the rear area, exhaust gases and dirt would be sucked in through the gap areas between the spoiler arrangement and the body by means of the fan and would be further guided into the heat circulating system. In addition, during the moved-out operative position, the units (radiator, fan) located below the spoiler arrangement would be visible from the outside.

It is an objective of the invention to arrange an adjustable spoiler arrangement at a vehicle having a rear engine in the rear area in which case such measures are taken that, on the one hand, an operationally appropriate admitting of cooling air to the radiator is ensured and that, on the other hand, the sucking in of exhaust gases and dirt through the fan is reliably prevented.

According to the invention, this objective is achieved by providing cover elements operatively connected with the spoiler arrangement to cover the rearward and sideward facing gaps between the cover elements and adjacent vehicle body parts. In especially preferred embodiments, cover elements include hinged members which pivot with respect to one another during movement between spoiler operative and inoperative positions. In certain preferred embodiments, the cover elements for the lateral gap areas are wall elements connected to the spoiler.

The main advantages achieved by means of the invention are that, by means of the cover elements between the spoiler arrangement and the body, an optimized admission of cooling air to the radiator takes place also in the moved-out operating position of the spoiler arrangement. In addition, because of the cover elements, no more exhaust gases or dirt particles are sucked in through the fan. Finally, the cover elements have the effect that the units located below the rear hood, such as the radiator and fan, are not visible from the outside of the vehicle to thereby provide visual screening.

Other objects, advantages and novel features of the present invention will become apparent from the following detailed description of the invention when considered in conjunction with the accompanying drawings.

DETAILED DESCRIPTION OF THE DRAWINGS

The passenger car 1 comprises a body 2 having a spoiler arrangement 4 located in the rear area 3. The spoiler arrangement 4 is adjustably movable from an inoperative position A extending flush with the adjacent body 2, into a moved-out operating position B, by means of adjusting devices. By means of the spoiler arrangement 4, on the one hand, the drag coefficient of the passenger car 1 is reduced and, on the other hand, during the driving operation, the dynamic downward pressure on the rear wheels is increased.

Figure 1:
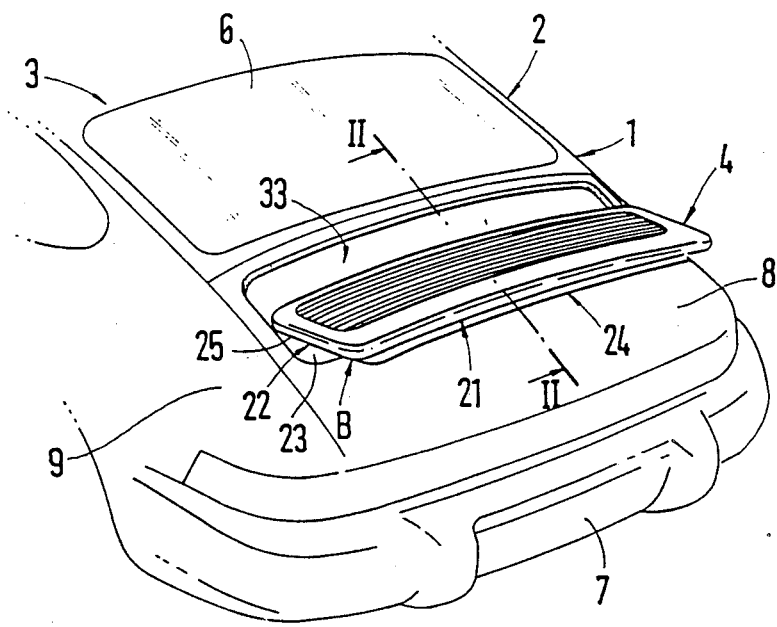
FIG. 1 is a diagonal perspective view from behind the rear area of a passenger car having a spoiler arrangement constructed in accordance with a preferred embodiment of the invention.
Figure 2:
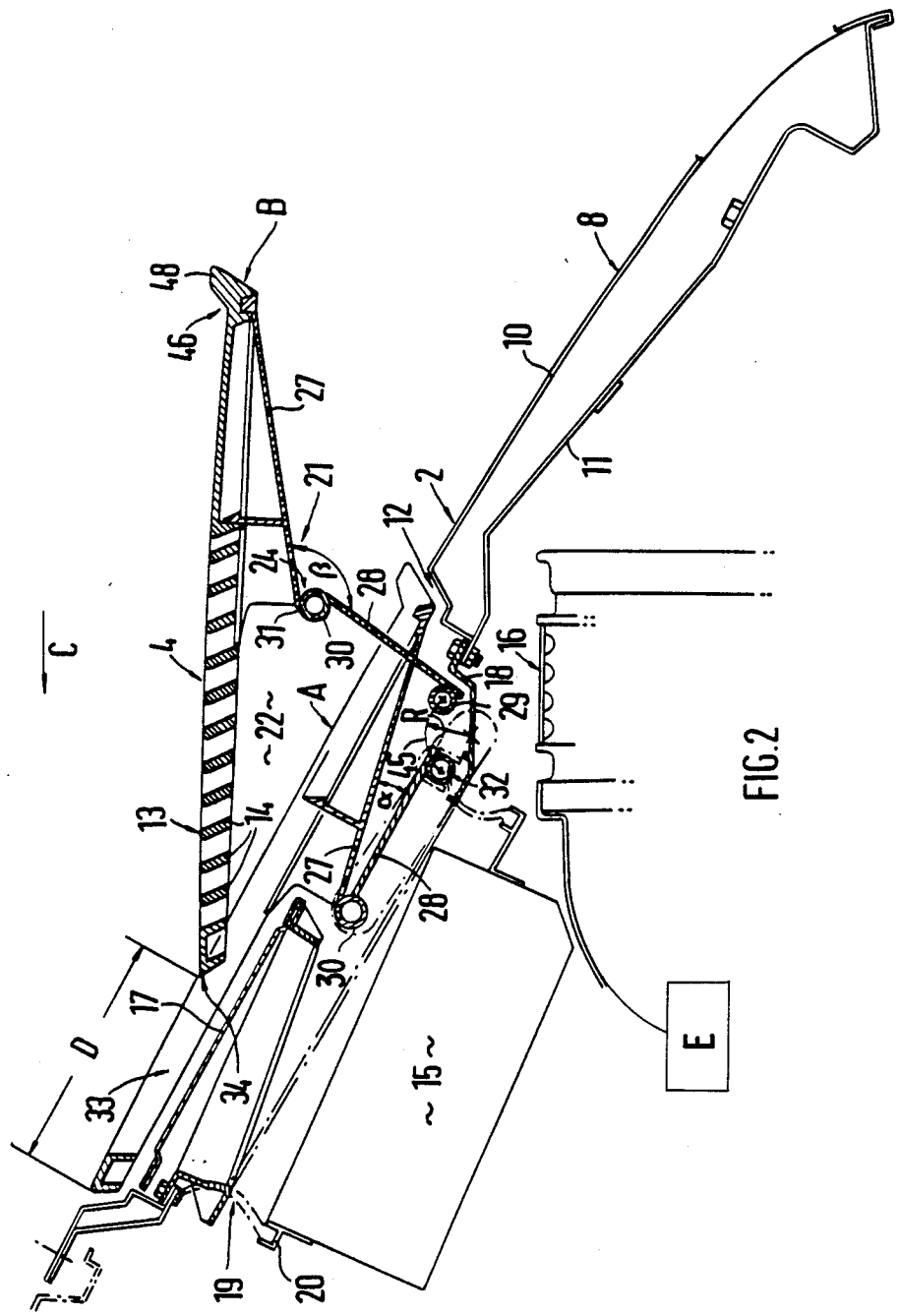
FIG. 2 is an enlarged sectional view taken along line II—II of FIG. 1.
Figure 3:
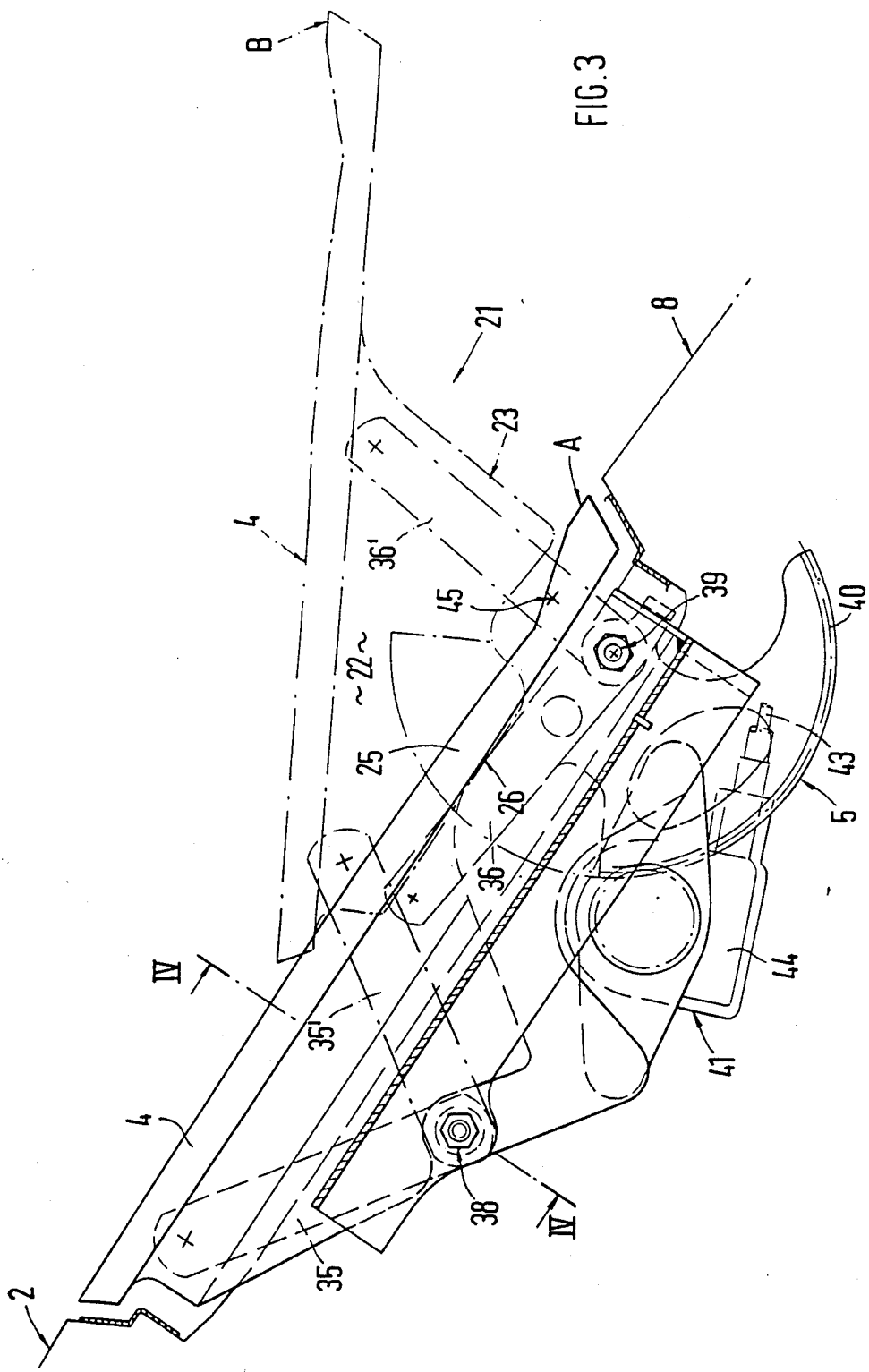
FIG. 3 is an enlarged schematic view depicting the mechanism controlling movement of the spoiler between inoperative and operative position.
Figure 4:
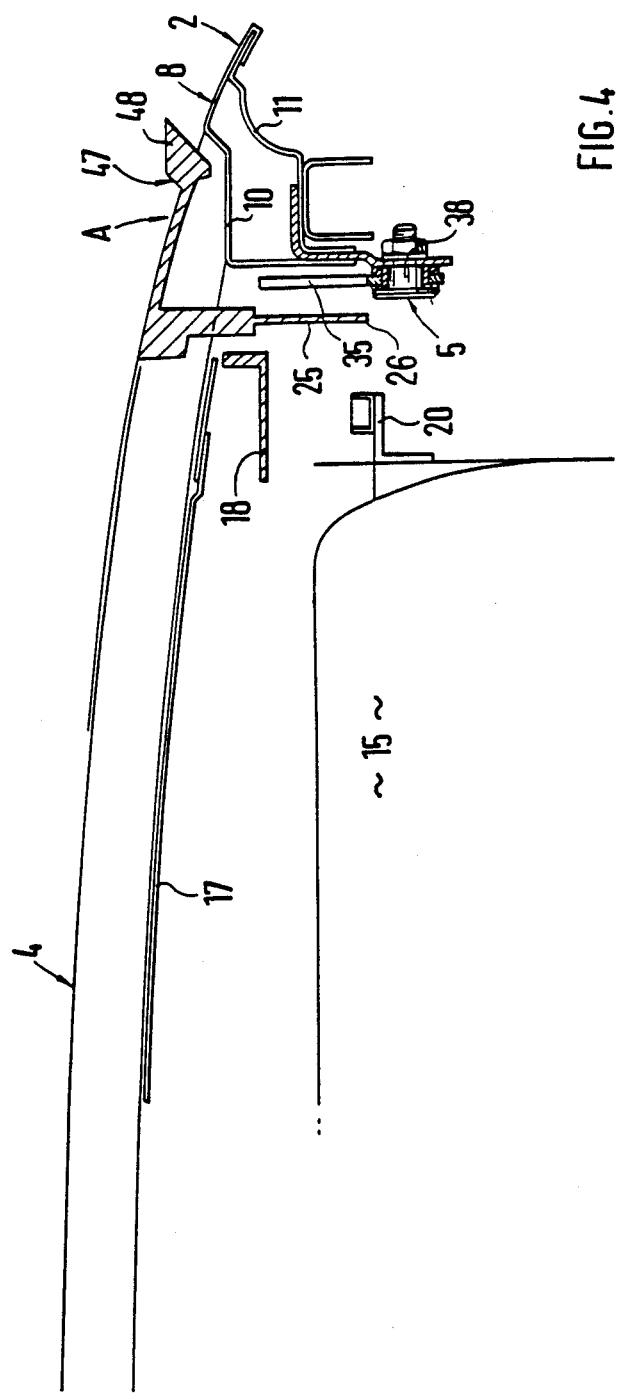
FIG. 4 is an enlarged sectional view taken along line IV—IV of FIG. 3.
Figure 5:
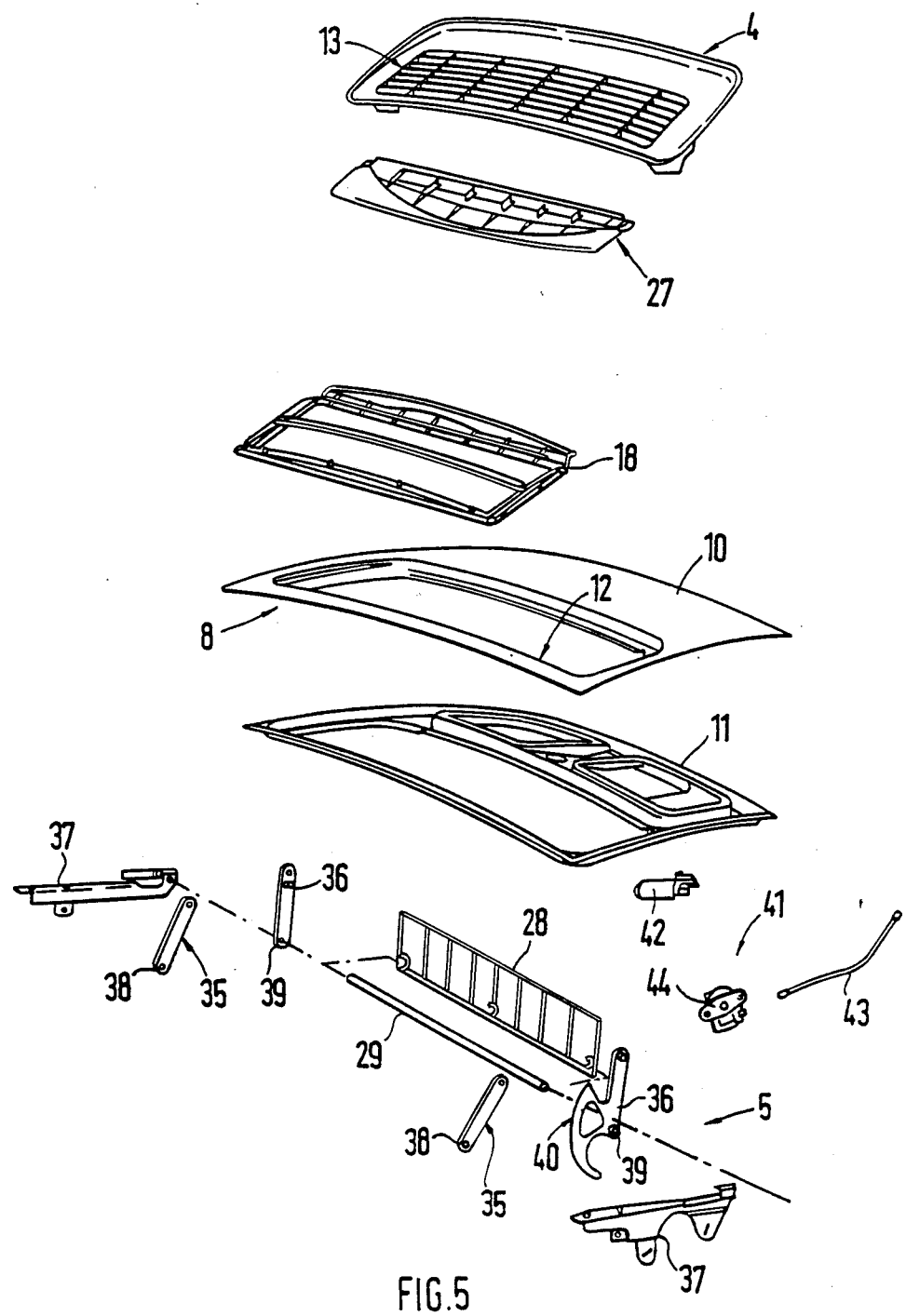
FIG. 5 is a perspective exploded view of the components of the rear hood and of the spoiler arrangement together with the actuating device according to the embodiment of FIGS. 1–4.

In the rear area 3, the body 2 includes a rear window 6, a bumper 7 and a rear hood 8 that is arranged between the lateral body parts 9. The rear hood 8 that is formed by an exterior part 10 and an interior reinforcing frame 11, has an approximately rectangular opening 12 into which the spoiler arrangement 4 is inserted (FIG. 2). In the inoperative position A, the flap or spoiler-type spoiler arrangement 4 extends flush with respect to the outer vehicle body shell with the contour of the rear area 3 that is developed like a fast back, whereas, in the operative position B, it is swivelled out of the level of the body in such a way that its exterior flow impact area is set approximately horizontally. At the same time, the spoiler arrangement 4 is shifted by the distance D, toward the rear against the driving direction C.

The spoiler arrangement 4 has a large-surface air inlet grid 13 that has several transverse struts 14. A radiator 15, an engine E and a fan 16 are arranged below the rear hood 8 or the spoiler arrangement 4. In the inoperative position A of the spoiler arrangement, the air taken in by the fan 16 flows from the vacuum area of the rear area 3 through the air inlet grid 13 to the radiator 15. Seen in flow direction of the cooling air, a fine-mesh grid 17 is provided directly behind the air inlet grid 13. The grid 17 is placed on a sealing frame 18 that is inserted into the opening 12 and is screwed together with the rear hood 8. So that a sufficient amount of cooling air is supplied to the radiator 13, a lip-shaped sealing means 19 is provided between the radiator 15 and the adjacent body 2. The sealing means 19 is inserted into a receiving frame 20 fastened at the radiator 15 and, with its free end, under pretension, rests against the sealing frame 18.

In the moved-out operative position B of the spoiler arrangement 4, said spoiler arrangement 4 extends at a distance to the body located below, whereby a gap is formed between the spoiler arrangement 4 and the body 2. In order to avoid that exhaust gases and dirt particles—because of the vacuum existing in the rear area 3—are taken in by means of the fan 16, a transversely extending gap area 21 located in the rearward driving direction—and the two longitudinally extending laterally outside gap areas 22, between the spoiler arrangement 4 and the body 2, are closed by cover elements 23, 24 in the moved-out operative position B of the spoiler arrangement 4.

The cover elements 23 for the lateral gap areas 22 are formed by wall sections 25 of the spoiler arrangement 4 that project in downward direction. Each lateral cover element 23 extends only in an area of the spoiler arrangement 4 that is located in front, when viewed in driving direction. A lower edge 26 of the cover elements 23 extends approximately at the level of the receiving frame 20.

The cover element 24 for the rear gap area 21 comprises two parts 27, 28 that are hinged to one another, one part 27 being fastened at the spoiler arrangement 4, and the other part 28 being fastened at a transverse tube 29 of the adjusting device 5. The two parts 27, 28 are preferably made of plastic.

Part 27 of the cover element 24 facing the spoiler arrangement 4 is connected with it either by gluing, clipping or the like or it is developed in one piece with the spoiler arrangement 4. The two parts 27, 28 of the cover element 24 are rotatably hinged to one another by means of a hinge 30, the shaft of which extends in transverse direction of the vehicle and is aligned approximately horizontally. In the inoperative position A, both parts 27, 28 of the cover element 22 are arranged above one another and extend at an acute angle α to one another. In the moved-out operative position B, the two parts 27, 28 of the cover element 22 extend at an obtuse angle β with respect to one another. In this case, the part 27 extends upright and is inclined in such a way that the shaft of the hinge 30—viewed in driving direction—is located further in the rear than the axis of the transverse tube 29. The end of part 28 facing the transverse tube 29 is connected with the transverse tube 29 via a clipped connection 32. The transverse tube 29, in this case, is received between two stop elements of part 28.

In the moved-out operating position B of the spoiler arrangement 4, the cooling air can therefore only flow to the radiator 15 through the opening 33 located in front of the spoiler arrangement 4. At the front edge 34 of the spoiler arrangement 4, a higher pressure level positive pressure gradient is created in the moved-out operative position B, whereby more cooling air is taken in and thus an improved cooling is achieved.

The adjusting arrangement 5, on each longitudinal side of the spoiler arrangement 4, comprises two control arms 35, 36 that, on one side, are rotatably connected with the spoiler arrangement 4 and, on the other side, with a rail 37 fastened on the side of the lid, and form a four-bar linkage. The pivots 38, 39, in this case, are developed to be stationary. The reference numbers 35', 36' signify the moved-out position of the control arms 35, 36.

The control arms 36, viewed in driving direction, are arranged in the rear and are connected with one another by means of the transverse tube 29. One of the two control arms 36 located in the rear has a tooth segment 40 that interacts with a driving arrangement 41. The driving arrangement 41 comprises an electric motor 42, a flexible shaft 43 and a worm gear 44 that meshes with the tooth segments 40 of the adjusting device 5. The worm gear 44 is flanged onto the adjacent rail 37.

Above the pivot 39, the transverse tube 29 is connected with the control arm 36 so that the transverse tube 29, during the adjusting movement of the spoiler arrangement 4, moves along an arc 45 with the radius R.

The spoiler arrangement 4, at its end 46 located in the rear and at both of its longitudinal sides 47, in each case has upward-projecting, spoiler-type profiled parts 48.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A spoiler arrangement for a rear engine driven motor vehicle comprising:
    a spoiler extending laterally across a rear section of a vehicle and covering at least a portion of an opening to a vehicle engine and radiator accommodating space;
    spoiler mounting means for mounting the spoiler for movement between an inoperative position flush with adjacent exterior vehicle body parts and an operative position spaced outwardly from the adjacent exterior body parts to enhance the vehicle aerodynamic characteristics; and
    cover element means for covering gaps formed between the spoiler and vehicle body parts forming the opening when the spoiler is in said operative position whereby sucking in of exhaust gases and other contamination to said space is reliably prevented, said cover element means comprising first and second rear cover parts configured to cover a rear gap area, said first rear cover part being formed in one piece with the spoiler, and said second rear cover part being fastened to an adjusting device for moving the spoiler between its inoperative and operative positions.

2. A spoiler arrangement for a rear engine driven motor vehicle comprising:
    a spoiler extending laterally across a rear section of a vehicle and covering at least a portion of an opening to a vehicle engine and radiator accommodating space;
    spoiler mounting means for mounting the spoiler for movement between an inoperative position flush with adjacent exterior vehicle body parts and an operative position spaced outwardly from the adjacent exterior vehicle body parts to enhance the vehicle aerodynamic characteristics; and
    cover element means for covering gaps formed between the spoiler and vehicle body parts forming the opening when the spoiler is in said operative position whereby sucking in of exhaust gases and other contamination to said space is reliably prevented, said cover element means comprising first and second rear cover parts configured to cover a rear gap area, said first rear cover part being fastened to the spoiler, and the second rear cover part being fastened to an adjusting device for moving the spoiler between its inoperative and operative positions, a hinge being provided between the first and second rear cover parts, said hinge having a pivot axis extending approximately horizontally and transversely of a travel direction of the vehicle.

3. A spoiler arrangement for a rear engine driven motor vehicle comprising:

a spoiler extending laterally across a rear section of a vehicle and covering at least a portion of an opening to a vehicle engine and radiator accommodating space;

spoiler mounting means for mounting the spoiler for movement between an inoperative position flush with adjacent exterior vehicle body parts and an operative position spaced outwardly from the adjacent exterior vehicle body parts to enhance the vehicle aerodynamic characteristics; and cover element means for covering gaps formed between the spoiler and vehicle body parts forming the opening when the spoiler is in said operative position whereby sucking in of exhaust gases and other contamination to said space is reliably prevented, said cover element means comprises first and second rear cover parts configured to cover a rear gap area, said first rear cover part being fastened to the spoiler, and the second rear cover part being fastened to an adjusting device for moving the spoiler between its inoperative and operative positions, the first and second rear cover parts being arranged one above the other and extending at an acute angle with respect to one another when the spoiler is in its inoperative position, whereas in the spoiler operative position, the first and second rear cover parts form an obtuse angle with respect to one another.

4. A spoiler arrangement according to claim 3, wherein the spoiler is carried in an opening in a hood member for covering the opening to the vehicle engine and radiator accommodating space.

5. A spoiler arrangement according to claim 1, wherein a hinge is provided between the first and second rear cover parts, said hinge having a pivot axis extending approximately horizontally and transversely of a travel direction of the vehicle.

6. A spoiler arrangement according to claim 5, wherein the first and second rear cover parts are arranged one above the other and extend at an acute angle with respect to one another when the spoiler is in its inoperative position, whereas in the spoiler operative position, the first and the second rear cover parts form an obtuse angle with respect to one another.

* * * * *